(12) United States Patent
Geffert et al.

(10) Patent No.: US 10,496,946 B2
(45) Date of Patent: Dec. 3, 2019

(54) SYSTEM AND METHOD FOR RISK-BASED AUDITING OF SELF-SCAN SHOPPING BASKETS

(71) Applicant: Catalina Marketing Corporation, St. Petersburg, FL (US)

(72) Inventors: William Geffert, Clearwater, FL (US); Aubrey Cheung, Malden, MA (US); Satish Gopalakrishnan, Arlington, MA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 285 days.

(21) Appl. No.: 14/212,211

(22) Filed: Mar. 14, 2014

(65) Prior Publication Data
US 2015/0127414 A1   May 7, 2015

Related U.S. Application Data

(60) Provisional application No. 61/900,855, filed on Nov. 6, 2013.

(51) Int. Cl.
| | | |
|---|---|---|
| G06Q 10/06 | (2012.01) | |
| G06Q 20/18 | (2012.01) | |
| G06Q 20/32 | (2012.01) | |

(52) U.S. Cl.
CPC ......... *G06Q 10/0635* (2013.01); *G06Q 20/18* (2013.01); *G06Q 20/322* (2013.01)

(58) Field of Classification Search
CPC ........ G06Q 30/02; G06Q 30/06; G06Q 20/20; G06Q 30/00; G06Q 20/01; G07G 1/0036; G07G 3/003
See application file for complete search history.

(56) References Cited

U.S. PATENT DOCUMENTS 5,388,165 A * 2/1995 Deaton et al. ................ 382/139
5,832,458 A * 11/1998 Jones .......................... 705/14.26
(Continued)

OTHER PUBLICATIONS

Dornbusch, Jane, Scan on a mission The Boston Globe, Nov. 9, 2011.*

(Continued)

*Primary Examiner* — Scott L Jarrett
(74) *Attorney, Agent, or Firm* — McDermott Will & Emery LLP

(57) ABSTRACT

The invention relates to systems and methods of selective auditing of mobile commerce baskets based on real-time behavior, profile information, event information, and/or other information in self-scan and other self-serve retail systems. The system may make a comprehensive, real-time, audit decision based on various risk factors that indicate a probability that a given shopping trip in a self-scan system includes a scan error. The audit decision may be parameterized such that different risk factors may be considered and weighted/prioritized with respect to other risk factors. For example, audit parameters may be used to determine which risk factors are used when processing the audit decision. The system may keep track of purchases, audits, and audit results in order to provide real-time reports and analytics. The system may also model audit decisions such that audit decisions may be simulated for a one or more retail locations during different time periods.

29 Claims, 7 Drawing Sheets

(56) References Cited

U.S. PATENT DOCUMENTS

| | | | | |
|---|---|---|---|---|
| 5,877,485 | A * | 3/1999 | Swartz | 235/383 |
| 5,883,968 | A * | 3/1999 | Welch | A47F 9/045 |
| | | | | 382/100 |
| 6,047,262 | A * | 4/2000 | Lutz | 705/16 |
| 6,092,725 | A * | 7/2000 | Swartz et al. | 235/383 |
| 6,155,486 | A * | 12/2000 | Lutz | 235/383 |
| 6,334,110 | B1 * | 12/2001 | Walter et al. | 705/14.41 |
| 6,382,357 | B1 * | 5/2002 | Morrison et al. | 186/61 |
| 6,484,939 | B1 * | 11/2002 | Blaeuer | 235/383 |
| 6,672,506 | B2 * | 1/2004 | Swartz et al. | 235/383 |
| 6,837,436 | B2 * | 1/2005 | Swartz et al. | 235/472.02 |
| 6,910,697 | B2 * | 6/2005 | Varatharajah et al. | 280/33.992 |
| 7,035,855 | B1 * | 4/2006 | Kilger et al. | 707/703 |
| 7,152,040 | B1 * | 12/2006 | Hawthorne et al. | 705/16 |
| 7,195,157 | B2 * | 3/2007 | Swartz et al. | 235/383 |
| 7,219,838 | B2 * | 5/2007 | Brewster | A47F 9/045 |
| | | | | 235/382 |
| 7,275,690 | B1 * | 10/2007 | White | G06Q 10/087 |
| | | | | 235/383 |
| 7,671,728 | B2 * | 3/2010 | Buehler | 340/506 |
| 7,673,797 | B2 * | 3/2010 | Edwards | 235/383 |
| 7,780,081 | B1 * | 8/2010 | Liang | G06Q 30/0633 |
| | | | | 235/383 |
| 7,839,276 | B2 * | 11/2010 | Rodgers | 340/501 |
| 7,889,608 | B2 * | 2/2011 | Ueki | 369/47.33 |
| 7,984,853 | B2 * | 7/2011 | Ali | 235/383 |
| 8,145,531 | B1 * | 3/2012 | Ptak | G06Q 20/208 |
| | | | | 235/381 |
| 8,181,865 | B2 * | 5/2012 | Daily | 235/383 |
| 8,358,700 | B2 * | 1/2013 | Kong et al. | 375/240.24 |
| 8,396,758 | B2 * | 3/2013 | Paradise et al. | 705/26.62 |
| 8,452,660 | B2 * | 5/2013 | Morris | 705/16 |
| 8,620,755 | B1 * | 12/2013 | Argue et al. | 705/24 |
| 8,630,927 | B1 * | 1/2014 | Argue et al. | 705/30 |
| 8,717,172 | B2 * | 5/2014 | Parker et al. | 340/568.1 |
| 8,720,771 | B2 * | 5/2014 | MacKinnon Keith | 235/375 |
| 8,746,557 | B2 * | 6/2014 | Connell et al. | 235/383 |
| 9,799,173 | B2 * | 10/2017 | Pedley | G07G 1/0045 |
| 2001/0015375 | A1 | 8/2001 | Swartz et al. | 235/383 |
| 2001/0017588 | A1 | 8/2001 | Symonds et al. | 340/568.5 |
| 2002/0178088 | A1 * | 11/2002 | Lurie et al. | 705/26 |
| 2003/0098910 | A1 * | 5/2003 | Kim | G06Q 20/20 |
| | | | | 348/150 |
| 2003/0102373 | A1 | 6/2003 | Swartz et al. | 235/383 |
| 2003/0225612 | A1 * | 12/2003 | DeSimone | G06Q 40/08 |
| | | | | 705/13 |
| 2004/0064357 | A1 * | 4/2004 | Hunter et al. | 705/10 |
| 2004/0073489 | A1 * | 4/2004 | Varatharajah et al. | 705/23 |
| 2006/0043175 | A1 * | 3/2006 | Fu et al. | 235/383 |
| 2007/0194112 | A1 * | 8/2007 | Petroskey | G06Q 20/20 |
| | | | | 235/383 |
| 2008/0005036 | A1 * | 1/2008 | Morris | 705/64 |
| 2008/0031491 | A1 * | 2/2008 | Ma et al. | 382/103 |
| 2008/0147511 | A1 * | 6/2008 | Edwards | 705/18 |
| 2008/0249793 | A1 * | 10/2008 | Angell et al. | 705/1 |
| 2008/0258877 | A1 * | 10/2008 | Rodgers | 340/10.3 |
| 2009/0002172 | A1 * | 1/2009 | Hannah et al. | 340/572.1 |
| 2009/0125406 | A1 * | 5/2009 | Lewis et al. | 705/23 |
| 2009/0150170 | A1 * | 6/2009 | Junger et al. | 705/1 |
| 2009/0212102 | A1 * | 8/2009 | Connell et al. | 235/375 |
| 2010/0306080 | A1 * | 12/2010 | Trandal et al. | 705/26.8 |
| 2011/0022480 | A1 * | 1/2011 | Hoblit et al. | 705/16 |
| 2011/0145092 | A1 * | 6/2011 | Paradise et al. | 705/26.35 |
| 2011/0295704 | A1 * | 12/2011 | Edwards | 705/16 |
| 2012/0190386 | A1 * | 7/2012 | Anderson | 455/456.3 |
| 2012/0320199 | A1 * | 12/2012 | Kundu et al. | 348/143 |
| 2013/0182114 | A1 * | 7/2013 | Zhang et al. | 348/150 |
| 2013/0311230 | A1 * | 11/2013 | Kellstrand et al. | 705/7.28 |
| 2014/0019241 | A1 * | 1/2014 | Treiser et al. | 705/14.53 |
| 2014/0039951 | A1 * | 2/2014 | Appel et al. | 705/7.11 |
| 2014/0067568 | A1 * | 3/2014 | Argue et al. | 705/21 |
| 2014/0214609 | A1 * | 7/2014 | Pedley et al. | 705/26.35 |
| 2015/0025969 | A1 * | 1/2015 | Schroll et al. | 705/14.53 |

OTHER PUBLICATIONS

Stuart, Courtney, Techno-grocer: Giant puts custoemr in control Charlotteville's Weekly Newspaper, May 8, 2009.*

Stores Weigh Risks and Rewards of Going Mobile Scanning Tech Promises Easy Checkout, In-Store Targeting—But Glitches Abound; Advertising Age, Oct. 28, 2013.*

Pinto-Coelho, Lise W. et al., An Analysis of Retail Self-Checkout System for Defense Commisary Agency Logistics Management Institute, Dec. 1996.*

McGoey, Chris E., Shoplifter Profiling—A Retail Loss Prevention Tool Mar. 27, 2009, Retrieved from CrimeDoctor.com Jul. 1, 2014.*

Preventing Shoplifting SmartCity.com, Jun. 2013, Retrieved from Archive.org Jul. 1, 2014.*

WhereNet to Assist Supermarkets and Consumer Goods Manufacturers With Analysis of Customer Buying Habits PR Newswire, Apr. 2, 2002.*

Gaynor, Mark, Hidden Cameras Reveal Human Side of P-O-P Story P-O-P Times, 1999.*

The Impact and Control of Shrinkage at Self-Scan Checkouts—An ECR Europe White Paper ECR Europe Shrinkage Group, Jan. 2011.*

McClain Al, Does Self-Checkout Cause Theft? Retailwire, Apr. 10, 2012.*

* cited by examiner

SYSTEM AND METHOD FOR RISK-BASED AUDITING OF SELF-SCAN SHOPPING BASKETS

CROSS-REFERENCE TO RELATED APPLICATIONS

This application claims priority to U.S. Provisional Patent Application Ser. No. 61/900,855, filed Nov. 6, 2013, which is hereby incorporated by reference herein in its entirety.

FIELD OF THE INVENTION

The invention relates to systems and methods of selective auditing of mobile commerce baskets based on real-time behavior, profile information, event information, and/or other information in self-scan and other self-serve retail systems.

BACKGROUND OF THE INVENTION

Self-scanning systems allow customers to scan items during a shopping trip, place the items in a mobile commerce basket (e.g., a shopping basket or shopping cart), and pay for the items later via mobile checkout, or at a specially designated self-checkout lane. These self-scanning systems offer customers the convenience of avoiding checkout lines while at the same time providing a mechanism for price checks and the like. Retailers can benefit by employing less cashiers or other checkout personnel, potentially boosting their profits.

However, self-scanning systems can be prone to scan errors, which may include unintentional errors such as a consumer forgetting to scan an item while shopping, or scanning an incorrect number of items when multiple items of the same item are purchased. In some instances, a consumer may deliberately engage in theft by failing to scan one or more items when they are placed in the mobile commerce basket. Whether intentional or not, scan errors result in lost profits.

Many retailers rely on random audits of the baskets of shoppers utilizing self-scanning systems to check for scan errors. While random audits may detect some scan errors, there is a risk of over-auditing and alienating loyal customers who rarely commit scan errors, while under-auditing customers who may commit scan errors more often. Thus, auditing customers should achieve a balance of providing maximum convenience for (and minimum frustration from) customers, while helping retailers minimize lost profits.

SUMMARY OF THE INVENTION

The invention addressing these and other drawbacks relates to systems and methods of selective auditing of mobile commerce baskets based on real-time behavior, profile information, event information, and/or other information in self-scan and other self-serve retail systems.

The system may make a comprehensive, real-time, audit decision based on various risk factors that indicate a probability that a given shopping trip in a self-scan system includes a scan error. The audit decision may be parameterized such that different risk factors may be considered and weighted/prioritized with respect to other risk factors. For example, audit parameters may be used to determine which risk factors are used when processing the audit decision.

The system may track purchases, audits, and audit results in order to provide real-time reports and analytics. A user of the system such as a retail manager, for example, may use the reports and analytics to adjust the audit parameters (and values of audit parameters) to suit their particular business needs, and may do so in response to real-time conditions as they occur.

The system may also model audit decisions such that audit decisions may be simulated for one or more retail locations. In this manner, a retail manager may test a new audit parameter and/or value of the audit parameter before using one or both in a production or "live" environment (e.g., an actual retail setting where actual audits occur). In some implementations, for example, the audit parameter and/or value of the audit parameter may comprise updated versions of production parameters/values so that a user may test the updated parameters/values before instituting them. This enables the effects of changes to the audit parameters/values to be observed without impacting the production audit process.

The system may simulate the audit decisions across different time periods (e.g., peak shopping times versus late night shopping times), different geographic locations, within different departments of a retail location, and/or across other groupings or categories.

To facilitate these and other functions, the system may include a computer that receives scan information from a self-scan device that the consumer may use while shopping in a retail location. The computer may include a physical processor that is programmed with computer program instructions to make an audit decision based at least in part on scan information. The scan information may identify an item, a price of the item, a location at which the item is located within a retail location, an identity of the retail location, an identity of the customer, and/or other information that describes a shopping trip.

The computer program instructions may include management instructions, item risk profiling instructions, customer risk profiling instructions, retail risk profiling instructions, real-time trip processing instructions, audit decision instructions, alert instructions, audit modeling instructions, and reporting and analytics instructions.

The management instructions may program the computer to process audit parameters received from users to adjust audit decisions, and receive and process information related to items, customers, and retail locations. Such information may be used as a basis for an audit decision.

The item risk profiling instructions may program the computer to determine a risk associated with a given item. A given item may be considered a higher risk than another item. For example, the given item may be historically more prone to scan errors than other items because it is typically associated with a relatively high rate of theft, has particular packaging that could be used to hide other items, tends to be placed in baskets unintentionally without being scanned, and/or for other reasons. Whatever the reason for a given item's increased level of risk, item risk profiling instructions may program the computer to determine that an audit is more likely to be triggered if the given item is scanned during a shopping process.

Customer risk profiling instructions may program the computer to determine a risk associated with a given customer. Similar to items, a given customer may be considered a higher risk than another customer. Customer risk profiling instructions may program the computer to determine a risk associated with a customer based on previous audit results, prior purchase histories or shopping behaviors, credit scores, and/or other information known about the customer. Higher risk customers may have a greater likelihood of being audited than those deemed to be a lower risk.

Retail risk profiling instructions may program the computer to determine risk associated with a given retail location. Similar to items and customers, a given retail location may be considered a higher risk than another retail location. For example, the given retail location may be located in a high crime area, or have a greater history of incidents of theft than another retail location. Customers at a high risk retail location may have a greater likelihood of being audited than customers at a retail location deemed to be of lower risk.

Real-time trip processing instructions may program the computer to determine real-time shopping behavior of customers. Real-time shopping behavior may include scanning activity, locations (including paths) within a retail location visited by a customer, voids that remove scanned items, and/or other shopping behaviors. The shopping information may be used to assess a risk associated with the current shopping trip. For example, a long duration of time in a given aisle without a scan of an item from the given aisle may be deemed risky behavior that increases the likelihood of an audit. Similarly, a scanned item that is located at an aisle that was not visited by the customer may be deemed risky behavior.

Each of the foregoing risk factors may be quantified and compared against a threshold value such that an audit may be triggered when the threshold value has been reached or exceeded by the quantified risk. Such quantified risk may be based on weighted individual risk factors, and each risk factor may be selected or de-selected by users for inclusion in the audit decision. In this manner, the system facilitates granular control over audit decisions.

Audit decision instructions may program the computer to use the foregoing risk determinations, audit parameters, rules for triggering audits, and/or other information to make an audit decision. In some implementations, the computer may be programmed to automatically select and adjust audit parameters (e.g., risk threshold values) based on previous audit histories. For example, to achieve particular audit results such as a particular number (or frequency) of audits in a given time period, the computer may be programmed to analyze statistics for prior audits to identify audit parameters to use and their respective settings that should be used to achieve similar results.

Alert instructions may program the computer to communicate one or more messages to audit personnel (e.g., those who will conduct the audit), asset protection personnel (e.g., security), and/or others. The messages may be communicated via Short Message Service text message, email, voice, checkout terminal, and/or other communication channels. The messages may relate to the audit decision, and may include instructions such as an audit flag that causes an audit to be initiated, instructions to investigate certain things such as whether a disguise item is being used to hide other items, a message to a customer service representative that a customer likely needs in-store assistance, and/or other messages.

Audit modeling instructions may program the computer to generate audit models used to simulate audit decisions. For example, a user may input various audit parameters. The computer may be programmed to simulate the audit decision based on prior shopping histories, audit histories, and/or other information. In this manner, a user may simulate the effects of different audit parameter configurations before placing such configuration into use.

Reporting and analytics instructions may program the processor to provide real-time reporting and analytics. The real-time reporting and analytics may provide metrics for current audit decisions, purchases, scans, and/or other information that reflects current conditions. As such, a user may alter audit parameters to respond to the current conditions such that audit decisions can be increased or decreased as needed. Furthermore, the real-time reporting and analytics may provide line item processing and reporting that tracks individual items as they are scanned. This may facilitate more thorough tracking of in-progress scans, voids, checkouts, and abandoned baskets where the self-scan shopping trip was not checked out.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
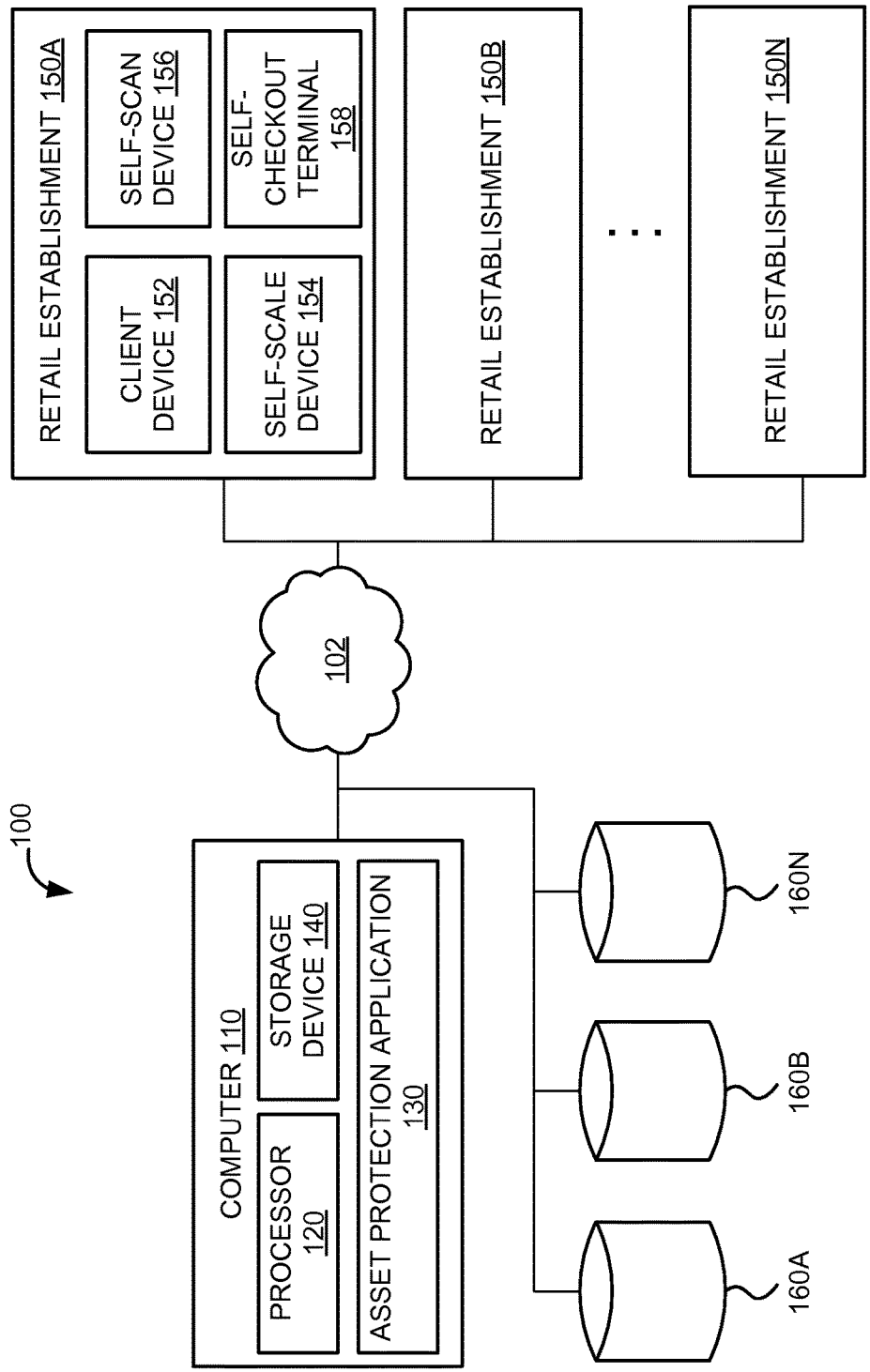
FIG. 1 illustrates a system of selective auditing of mobile commerce baskets, according to an implementation of the invention.

FIG. 1 illustrates a system 100 of selective auditing of mobile commerce baskets, according to an implementation of the invention. A mobile commerce basket may include one or more items that were scanned or otherwise read using a device operated by a user in a retail establishment that offers self-scan and/or other self-service features. The device may maintain information related to scanned items during a given shopping trip so that the user may later purchase the items during a self-checkout process, which may occur via the device, at a self-checkout terminal of the retail establishment, and/or via another device or system that facilitates payment for the items in the mobile commerce basket.

System 100 may selectively cause an audit of the mobile commerce basket, which typically involves verifying whether some or all of the contents of the mobile commerce basket match the scanned items (e.g., whether an item in the mobile commerce basket was actually scanned, whether a scanned item is actually in the mobile commerce basket, etc.). For example, system 100 may prevent the checkout process from occurring and/or communicate an alert to personnel that such an audit should be undertaken, at which time the personnel may perform the audit.

System 100 may make an audit decision (e.g., determine whether an audit should occur) based on a combination of robust analysis of previous audit results and information from previous or current shopping trips. System 100 may therefore facilitate targeted audits that lead to greater detection of scan errors and greater customer satisfaction due to reduced incidents of audits for mobile commerce baskets that should not have been audited. Such scan errors can include intentional scan errors (e.g., related to theft or fraud) or unintentional scan errors (e.g., accidental scan errors such as a customer forgetting to scan an item).

In some implementations, system 100 may make the audit decision based on one or more risk factors that, when taken alone or in combination, exceed an audit threshold. The risk factors may relate to an item risk, a customer risk, a retail location risk, and/or other type of risk that indicates a probability that a scan error has or will occur in a given mobile commerce basket. In some implementations, system 100 may make the audit decision based on one or more audit rules that cause an audit to be triggered. Such audit rules may be provided and configured by retail managers and others such that an audit can be triggered irrespective of the one or more risk factors. In some implementations, system 100 may take into consideration the audit rules and the one or more risk factors.

In some implementations, system 100 may maintain a history of previous and/or current shopping trips and audits that have been triggered. As such, system 100 may provide retailers with real-time and/or historical reports and analytics related to customers, items audited, audits of customers, audits of individual retail locations, audits of retail locations in a given region, etc. In this manner, system 100 allows retailers to view the results of the auditing process and make adjustments as necessary to suit their own business objectives.

To facilitate adjustments to the auditing process, system 100 may provide a management interface that allows retailers to adjust their auditing programs. For example, a given retailer may tailor one or more audit parameters for a given retail location/establishment that affects the frequency, type, and/or other characteristics of audits that are triggered at the given retail establishment. In this manner, a given retailer may customize selective audits that occur at individual retail establishments. Furthermore, different retail chains may provide different audit parameters and/or values for the audit parameters to suit their particular needs.

In some instances, system 100 may model the audit process so that retailers may view the effects that different audit parameters and/or values of the audit parameters may have on the selective audits. For example, using previous audit and shopping histories, system 100 may model the audit process and apply a given audit parameter and/or value to the model to simulate audit decisions. In this manner, system 100 may predict a frequency of selective audits and/or the identity of mobile commerce baskets that would likely be audited given the audit parameters and/or values.

Other uses of the system 100 are described herein and still others will be apparent to those having skill in the art. Having described a high level overview of some of the system functions, attention will now be turned to various system components that facilitate these and other functions.

System 100 may include a computer 110, one or more databases 160 (illustrated in FIG. 1 as databases 160A, 160B, . . . , 160N), one or more retail establishments 150 (illustrated as retail establishments 150A, 150B, . . . , 150N), and/or other components. Each retail establishment 150 may include or otherwise be coupled with a client device 152, a self-scale device 154, a self-scan device 156, a self-checkout terminal 158, and/or other components.

Client device 152 may include a computing device used by a retail user (e.g., a store employee) to access management functions of system 100 described herein. For example, client device 152 may be used to view audit reports and analysis, adjust and set audit parameters, and/or otherwise interface with system 100.

A given retail establishment 130 may employ a self-scanning system that includes self-service functions that enable its customers to scan and bag items. The items may include items that are purchased based on their weight such as produce, bulk item, and/or other weighed items. As such, retail establishment 130 may include self-scale device 154, which may include a scale that is used in conjunction with the self-scanning system. For example, self-scale device 154 may be programmed to receive an identification that identifies an item that is purchased based on its weight and determine the weight of the item. Self-scale device 154 may produce a printed medium that encodes the item identification, weight, price, and/or other information. In some implementations, self-scale device 154 may transmit the foregoing information to self-scan device 156 so that the self-weighed items may be checked out during a checkout process associated with the self-scanning system.

The self-scanning system may include or otherwise interface with self-scan device 156 that obtains scan information. The scan information may include an identifier that identifies an item that was scanned by self-scan device 156, a description of the item such as a brand name, a price, a location within the retail location at which the item is shelved, a weight of the item, and/or other information. The term "scan," "scanning," and similar terms may refer to the process of reading information that identifies an item such as by scanning a printed code (e.g., a barcode, Quick Response ("QR") code, etc.), reading radio frequency emissions from a Radio Frequency Identification ("RFID") chip, and/or otherwise obtaining information from a medium that can convey the information. Typically, although not necessarily, such a medium is affixed to the item for identification purposes.

Self-scan device 156 may include a consumer's mobile device programmed with a self-scan mobile application used to scan items, a self-scan device provided by a retailer, and/or other device. Computer 110 may obtain the scan information to identify items that have been scanned by the consumer during a current shopping trip.

In some implementations, self-scan device 156 may be programmed to determine or otherwise provide location information that indicates a location of the consumer during the current shopping trip. Such location information may include an item identification (e.g., a Universal Product Code) that is scanned by self-scan device 156 and is used to lookup a location of a corresponding scanned item (e.g., via a planogram or other location mapping information), Received Signal Strength Indications, trilateration, multilateration, Global Positioning System information, and/or other location-indicating information. System 100 may use the location information to determine locations that the customer visited, duration of time at each location, either or both of which may be used when determining whether to trigger an audit.

Upon making item selections, a customer may pay for the scanned items via the self-scan device 156. For example, the self-scan device 156 may be programmed with a wallet application used to pay for the scanned items. In other instances, the customer may pay for the scanned items at self-checkout terminal 158. Regardless of how a consumer may checkout, system 100 may selectively cause an audit to occur.

Computer 110 may include one or more processors 120 programmed by one or more computer program instructions that causes the audit to occur, as well as perform other functions. For example, processor 120 may be programmed by an asset protection application 130 that causes the processor 120 to perform one or more of the various functions described herein. Asset protection application 130 may obtain the scans during the current shopping trip and make an audit decision based on the scans and/or other information, as described with respect to FIG. 2.

In some implementations, some of all of the functions of asset protection application 130 may additionally or alternatively be performed by components of system 100 other than computer 110. For example, client device 152, self-scan device 156, self-checkout terminal 158, and/or other components may each individually and/or together perform at least some of the functions and operations of asset protection application 130.

Figure 2:
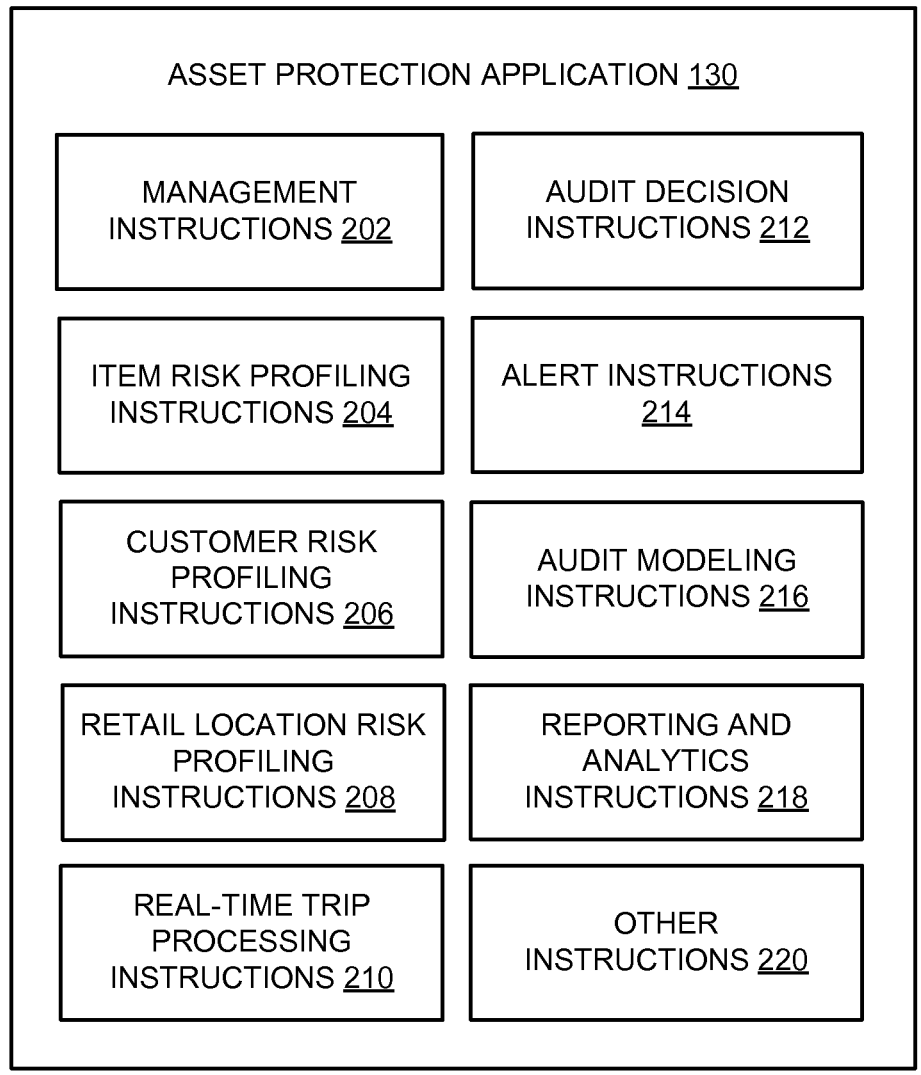
FIG. 2 illustrates an example of an asset protection application, according to an implementation of the invention.

Referring to FIG. 2, asset protection application 130 may include various instructions such as management instructions 202, item risk profiling instructions 204, customer risk profiling instructions 206, retail location risk profiling instructions 208, real-time trip processing instructions 210, audit decision instructions 212, alert instructions 214, audit modeling instructions 216, reporting and analytics instructions 218, and/or other instructions 220.

In some implementations, management instructions 202 may program processor 120 to receive management information used by system 100 for audit triggering, audit reporting and analytics, and/or other functions. Management instructions 202 may receive the management information via an interface such as a webpage operated by users such as retail managers and others. Management instructions 202 may cause the information to be stored in one or more management databases such as a database 160 as described herein.

The management information may include, for example, audit parameters used to control audit decisions, retail locations and hours, department hours, staffing levels, and/or other information. The audit parameters may specify a minimum number of audits to perform during a given time period (e.g., 1 hour, 3 hours, a business day, etc.), a maximum number of audits to perform during the given time period, a minimum frequency of audits during the given time period, a maximum frequency of audits during the given time period, rules for triggering audits, and/or other criteria that system 100 may use in an audit decision.

In some implementations, item risk profiling instructions 204 may program processor 120 to determine a level of risk associated with an item. For example, a given item may be associated with a certain probability of being involved in a scan error. In other words, a given item may be more prone to scan errors than another item. For example, different items may be associated with different frequencies of intentional theft, different frequencies of accidental scan errors, and/or other differences in properties that cause different items to have different probabilities of being associated with a scan error.

Item risk profiling instructions 204 may program processors 120 to determine the level of risk associated with an item based on item profile information that describes the item. The item profile information may include information that indicates a propensity of the item to be involved in scan errors, certain properties of the item that increases its risk level, and/or other information related to the item. For example, the item profile information may indicate that the item is commonly used as a disguise item to hide other items that were not scanned but placed in the mobile commerce basket. Such disguise items may have certain packaging or other properties that can be exploited by customers to conceal other items that were not scanned. An item that is known to have such disguise properties may be associated with a higher level of risk (and therefore greater chance of triggering an audit) than another item that does not have such disguise properties.

In some implementations, the propensity of a given item to be involved in a scan error may be based on risk threshold values set by the system, users such as retail managers, and/or others. For example, a price threshold may be established such that items having a price above the price threshold may be deemed risky while another item below the price threshold may be deemed less risky. The risk threshold values may be graduated such that different levels of threshold values may be associated with different levels of risk. For example, the level of risk of an item may increase as a function of its price.

Other types of item profile information may include, for example, information indicating a tendency for the item to be tampered with (e.g., to add an additional product or products), information indicating that the item tends to be incorrectly weighed, information indicating a class of item (e.g., electronics), high price variations with low distinction, frequency of returns/return rate, and/or other information about the item that may be indicative of an item's propensity to be involved in a scan error or otherwise its level of risk.

Item risk profiling instructions 204 may program processor 120 to derive item profile information from observed audit histories, input by users (e.g., retail managers), and/or other sources of item profile information. For example, the propensity of a given item to be involved in a scan error may be determined based on observations that the item was previously associated with a mobile commerce basket that was audited and included a scan error. Alternatively or additionally, the propensity of a given item to be involved in a scan error may be determined based on input by users that flag the given item as being a high risk item. Such input may be provided by the users via management instructions 202.

In some implementations, the item profile information may differ across different retail locations, retailers, geographic locations, times of the year, days of the week, times during a day, and/or other characteristics with which the item profile information may be associated. For example, a given item may be more prone to theft in certain locations than other locations. By allowing granular control over the item profile information, item risk profiling instructions 204 facilitate custom risk management and audit decisions.

Furthermore, by allowing item profile information to be automatically derived and/or provided by users (e.g., retail managers and others), and then leveraging the item profile information in audit decisions, system 100 may improve detection of scan errors while reducing incidents of audits that should not have been triggered.

In some implementations, customer risk profiling instructions 206 may program processor 120 to determine the level of risk associated with a customer based on customer profile information. The customer profile information may include information that indicates a propensity of the customer to be involved in scan errors, certain properties of the customer that increases the risk level associated with the customer, demographic information of the customer, and/or other information related to the customer.

The customer profile information may include information related to previous audits that were conducted on the customer, which may be used as a basis for determining a risk level for a given customer. For example, customer risk profiling instructions 206 may determine that a customer having several instances in which scan errors were detected during previous audits is more risky (e.g., has a greater probability of being associated with a scan error) than another customer having fewer instances or rates in which scan errors were detected during previous audits.

The customer profile information may include information that indicates previous shopping behavior such as abandoned mobile commerce baskets. Abandoned mobile commerce baskets include baskets that were started but not checked out. In other words, abandoned mobile commerce baskets include instances where at least one item was scanned but not checked out. In some implementations, customer risk profiling instructions 206 may determine that a customer that is associated with a greater number of abandoned mobile commerce baskets is riskier than another customer that is associated with a lesser number of such abandoned baskets.

The customer profile information may include information that indicates previous purchases, previous returns, experience with self-scanning systems, and/or other information known about the customer. For instance, customer risk profiling instructions 206 may determine that a customer who purchases high risk items (as determined from corresponding item profile information) may be riskier than another customer who does not make such purchases. Customer risk profiling instructions 206 may also determine that a deviation from usual purchases made by a given customer (or expected to be made based on the customer's demographic information) may indicate riskier behavior for the given customer. As such, customer risk profiling instructions 206 may determine different risk profiles for a given customer depending on current shopping behavior compared to previous shopping behavior. In some implementations, customer risk profiling instructions 206 may determine different risk profiles for a given customer depending on the time of week and other parameters similar to item profile determinations.

The customer profile information may include information obtained about a given customer from external sources that may indicate that the given customer may present a risk. For example, the customer profile information may include an Internet Protocol ("IP") address or other device identifying information known to be used by the customer, credit cards or other payment devices used by the customer, credit scores/reports, and/or other information related to the customer that may indicate a level of risk associated with the customer.

The IP address or other identifying information of a device that is used by the customer may be obtained based on a visit to a website that collects the identifying information, a mobile application (e.g., a self-scan application executing on the user's mobile device) that reports the identifying information, and/or other sources. Customer risk profiling instructions 206 may determine that the device used by the customer is associated with risky activity such as being blacklisted as a spammer. As such, customer risk profiling instructions 206 may determine that the customer who uses the device has a certain level of risk.

Customer risk profiling instructions 206 may determine that a credit card or other payment device used by the user may be associated with risky activity such as having been reported as a stolen card, having been declined for insufficient funds, and/or other risky activity. As such, customer risk profiling instructions 206 may determine that the customer who uses the credit card or other payment device has a certain level of risk.

Customer risk profiling instructions 206 may determine that a customer is risky based on credit scores/reports from credit bureaus and/or other sources of credit information. For example, customer risk profiling instructions 206 may determine that a given customer is risky based on certain negative credit information known about the customer.

In some implementations, retail risk profiling instructions 208 may program processor 120 to determine the level of risk associated with a given retail location (or set of locations) based on retail profile information. The retail profile information may include information that indicates a propensity of a given retail location, sets of retail locations, retailers, etc., to be involved in scan errors. For example, the retail profile information may include geographic locations, hours of operation, departments, known store shrink, camera or other security coverage within the retail location, and/or other information that describes a retail location.

A given retail location may in a geographic area that has a high crime rate or otherwise is associated with high rates of scan errors. As such, retail risk profiling instructions 208 may determine that a particular retail location is risky based on the geographic area at which the retail location is located.

Different times of the day may also be more risky than others. As such, retail risk profiling instructions 208 may determine that a given store is riskier at one time of the day (e.g., late at night) versus another time of the day (e.g., during the middle of the day). Furthermore, retail risk profiling instructions 208 may determine that a given retail location that is open later than another retail location may be riskier during those later hours.

Different departments may present different risks. For example, a department having items that are considered high risk (e.g., an electronics department) may present higher risk than another department. As such, retail risk profiling instructions 208 may deem one department within a given retail location to be riskier than another department. Likewise, retail risk profiling instructions 208 may determine a retail location that has a risky (high value) department to be riskier than another retail location that does not have a similar high-risk department.

With respect to the various risk profiling instructions described herein, the terms "risky," "level of risk," and similar terms may refer to a quantifiable level of risk. Such quantifiable level of risk may include a probability that a given item will be involved in a scan error, a probability that a given customer will be involved in a scan error, a probability that a given retail location or department will have an item that is involved in a scan error, and/or other types of quantifiable metric of risk. As such, the quantifiable level of risk may be higher or lower for different items, customers, retail locations, etc., and such riskiness may be used in audit decisions, as described below with respect to audit decision instructions 212.

In some implementations, real-time trip processing instructions 210 may program processor 120 to obtain and process current shopping trip information, which may be stored as part of one or more types of profile information (e.g., customer profile information) described herein. For example, real-time trip processing instructions 210 may program processor 120 to obtain scan information from self-scan device 156.

The scan information may be used to determine items that were scanned, locations that are/were visited during the shopping trip (e.g., based on location information directly from self-scan device 156 and/or location information from a planogram or other database of locations for items), a duration of time between scans, a duration of time at a given location, a duration of the total shopping trip, and/or other information that describes a current (real-time) shopping trip.

The current shopping trip information may be used to determine levels of risk. For example, the duration of time at a particular location without a scan of an item from that location may indicate that a scan error has occurred. Such determinations may be based on historical audits used to quantify the level of risk. For example, audit history information may indicate that scan errors were detected in two percent of previous audits in which a particular duration of time has elapsed at the meat department without a scanned meat item. As such, the particular duration of time may be associated with a probability of two percent of having an associated scan error.

Other information described herein may similarly be quantified to a level of risk. In other instances, a user such as a retail manager may configure the quantifiable levels of risk with the duration of time and/or other risk-indicating information described herein.

In some implementations, real-time trip processing instructions 210 may program processors 120 to maintain and store (persistently or transiently) each item that was scanned, removed (e.g., deleted by the user from the list of scanned items as if the item was returned to the shelf), checked out (e.g., paid for), and/or otherwise involved in the real-time shopping trip. In this manner, a log of items may be maintained for each shopping trip, which may be stored in various databases described herein. Real-time trip processing instructions 210 may program processor 120 to determine instances of abandoned trips based on scanning activity and lack of checkout activity for a given shopping trip.

In some implementations, audit decision instructions 212 may program processor 120 to make an audit decision based on the item profile information, item risk, customer risk profile information, customer risk, retail risk profile information, retail risk, real-time shopping information, and/or other information. Audit decision instructions 212 may program processor 120 to make the audit decision based on a configurable set of parameters that define whether and how much to take into account the foregoing information used as the basis for the audit decision.

For example, a given retail manager may wish for customer risk to be the sole parameter in the audit decision. Another retail manager may wish for the customer risk combined with retail risk to be used in the audit decision. Still other retail managers may prefer other single parameters or combinations of parameters to be used. Such preferences may be specified and stored by system 100 via management instructions 202. In the absence of such preferences, audit decision instructions 212 may program the processor 120 to use default parameter sets.

In some implementations, whether all or a portion of the foregoing information is used in the audit decision, each piece of information may be weighted relative to other information in order to arrive at risk quantification. For example, the price of an item, whether the item is known/determined to be a disguise item, a customer's credit score, a geographic location of a retail location, and/or other information used to make the audit decision may be weighted in order to define a relative importance of each piece of information used to determine a level of risk and therefore an outcome of the audit decision. If the determined level of risk exceeds a predetermined and/or configurable risk threshold value, audit decision instructions 212 may program processor 120 to trigger an audit.

In some implementations, the determined level of risk may be converted to a score that is added to the corresponding customer's overall score, which can be used to determine whether to audit the customer, as described in U.S. patent application Ser. No. 13/896,862, filed May 17, 2013, entitled "System and Method of Initiating In-Trip Audits in a Self-Checkout System," which is hereby incorporated herein by reference in its entirety. For example, the determined level of risk may include a probability of being involved in a scan error, and then the probability may be converted to a numeric score using a predefined multiplier or other variable.

In some implementations, audit decision instructions 212 may program processor 120 to make an audit decision based on one or more rules, which may be predefined and/or configured by users such as retail managers and others (e.g., input via functions provided by management instructions 202). Different rules may cause different audit decision results. For example, a given rule may specify that audits should occur at a given frequency at particular staffing levels. In this manner, the given rule may cause audits to occur more or less frequently depending on the staff that may be on-hand to perform audit checks.

Another rule may specify that audits should occur differently depending on the time of day. For example, a user may specify that audits should occur at a particular frequency during peak shopping hours and that audits should occur at a different frequency during different (e.g., late night) shopping hours. Some rules may specify a maximum number of audits that are allowed during a given time period, while other rules may specify that a minimum number of items in a mobile commerce basket be required to consider an audit. Different types of rules may be used to specify when and how often audits should be triggered. Furthermore, different rules may be established for different retailer locations within a given retail chain, and different rules may be set up by different retail chains, allowing for granular control over audit decisions.

In some implementations, the rules may be driven by business considerations. For example, the rules may specify that audits should occur after certain dollar, item count, or customer count thresholds have been met or exceeded, or otherwise be driven by time-to-process audits, missing events, and/or other business considerations.

In some implementations, audit decision instructions 212 may program processor 120 to make an audit decision based on the parameters and/or rules. In this manner, a combination of real-time processing of risk information and predefined rules may be used to fine-tune audit decisions. In some implementations, audit decision instructions 212 may program processor 120 to initiate an audit for a particular customer or group of customers based on an input from a user such as a retail manager. In this manner, the user may explicitly cause an audit to occur without regard to an audit decision made by audit decision instructions 212.

In some implementations, audit decision instructions 212 may program processor 120 to record the reasons (e.g., risks) for the audit decision, whether or not an audit was triggered. Such rationale may be stored in one or more databases for reporting and analysis.

In some implementations, alert instructions 214 may program processor 120 to communicate one or more real-time and/or batched messages to one or more parties in relation to the audit decision. For example, alert instructions 214 may program processor 120 to provide one or more messages to customer service personnel to assist a shopper who may be detected to have problems scanning items, audit personnel to initiate an audit, asset protection personnel (e.g., security) to investigate a customer who may be stealing, various databases described herein to store information related to the audit decision, and/or other parties to provide information related to the audit decision.

In some implementations, alert instructions 214 may program processor 120 to provide specific instructions or information for investigation based on item profile information, customer profile information, retail profile information, current shopping trip information, and/or other information.

For example, alert instructions 214 may provide instructions to verify that the number of a particular item in a mobile commerce basket matches the number of times that the particular item was scanned or otherwise added for checkout via the self-scan device 156. In the foregoing example, the customer profile information may indicate that the customer has a high rate of returned merchandise and therefore may scan a given item less than a number of actual items that the customer places in the mobile commerce basket.

Alert instructions 214 may provide specific instructions to search for items that may be hidden in another item known to be disguise packaging, verify that a size (e.g., number of ounces or weight) of a given item that was scanned matches the size of the item that was placed in the mobile commerce basket, and/or other types of instructions based on the information used in the audit decision.

In some implementations, audit modeling instructions 216 may program processor 120 to model audit decisions based on input parameters, rules, and/or other information. For example, a user such as a retail manager may input parameters such as audit thresholds that trigger audits, parameters that identify and weight risk information (e.g., customer risk, item risk, retail risk, etc.) used in the audit decision, and/or other information that affects the audit decision for one or more retail locations.

Audit modeling instructions 216 may program processor 120 to simulate audit decisions for the one or more retail locations using the input parameters based on historical purchase and audit histories for the one or retail locations. For example, audit modeling instructions 216 may obtain previous purchase information made at the one or more retail locations, customers who previously shopped at the one or more retail locations, audit decisions, audit results, and/or other information known about the one or more retail locations to simulate audit decisions. In a particular example, if the one or more retail locations typically are patronized by high-risk customers, increasing the weight of customer risks may cause audit modeling instructions 216 to predict that an increased number of audits will occur compared to the historical reference information that used a lesser weight for customer risks. Other adjustments and parameters may similarly be compared against historical information such that audit decisions may be modeled.

In some implementations, the models may take into account seasonality, time of day, time of the week, and/or other time factors. In this manner, audit modeling instructions 216 may program processor 120 to be able to predict audit decisions during different time periods (e.g., given the same parameters an audit decision prediction may be different for morning time periods than for late night time periods).

In some implementations, the models may be used to dynamically determine audit parameters used in the audit decision. For example, referring to audit decision instructions 212, processor 120 may be programmed to dynamically adjust the parameters used to make audit decisions. Audit decision instructions 212 may receive high-level parameters such as a maximum number or frequency of audits in a given time period, staffing levels, and/or other high-level information and then adjust the parameters (e.g., whether to use item risk, customer risk, retail risk, weight levels for any of the foregoing, and/or information and thresholds) until the high-level parameters are fulfilled/satisfied.

For example, audit decision instructions 212 may adjust the parameters used in an audit decision such that a maximum number of audits (including maximum number of concurrent audits) in a given time period is not exceeded, while maximizing the number of detected scan errors and minimizing the number of audits that do not detect scan errors. Audit decision instructions 212 may achieve the foregoing by ranking the risk associated with items, customers, retail locations, current shopping trip, and/or other information and then selecting the highest risk factors as parameters for the audit decision. When a given customer is determined to be a high risk based on customer profile information and the given customer is currently shopping at a retail location that is deemed to be low risk during a low risk time period, audit decision instructions 212 may automatically identify the customer risk to be used as a parameter for the audit decision and de-emphasize (e.g., not use or weight less) the retail risk. Other types of risk and information may be similarly considered as well. In this manner, audit decision instructions 212 may automatically determine parameters as well as their respective weights to be used for the audit decision.

In some implementations, reporting and analytics instructions 218 may program processor 120 to provide real-time and/or batched reporting and analytics. For example, as customers use respective self-scan devices 156, reporting and analytics instructions 218 may provide detailed reports on real-time risks posed individually by each customer and/or collectively by all or a group of customers. For example, reporting and analytics instructions 218 provides drill down capability for a given customer or group of customers. In this manner, a user may individually or collectively monitor customer risks and drill down into particular customer profile information that led to the customer risk assessment. Other types of risks such as item risks associated with items being scanned may be similarly viewed in real-time and/or batched.

The robust reports and analytics may facilitate real-time adjustments to the audit parameters to increase, decrease, or otherwise fine-tune audit decisions to address current conditions. For example, a user such as a retail manager may decide, based on the reports, that current risk levels are high and audit or loss prevention staff is available for one or more retail locations. As such, the user may cause increased audits to occur by increasing the maximum number of audits allowed, weight more heavily certain risk factors used in the audit decision, and/or otherwise adjusting the parameters to change the number of audits that will (or can) occur.

In some implementations, reporting and analytics instructions 218 program processor 120 to obtain and provide item-level information. For example, once scan information related to a given item is received, the scan information may be maintained so that the "life cycle" of the item may be tracked. The life cycle may include a time in which the item was scanned, a location at which the item was scanned, whether the item was indicated as having been removed from mobile commerce basket, a price of the item, a size/weight of the item, checkout information for the item, and/or other information related to the item.

The various instructions described herein are exemplary only. It should be appreciated that some of all of the instructions illustrated in FIG. 2 may be associated with a single application or multiple applications. As such, asset protection application 130 can include one or more applications each having one or more of the instructions illustrated in FIG. 2.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 120 may be programmed with one or more additional instructions that may perform some or all of the functionality attributed herein to one of the instructions.

The various instructions described herein may be stored in a storage device 140, which may comprise random access memory (RAM), read only memory (ROM), and/or other memory. The storage device may store the computer program instructions (e.g., the aforementioned instructions) to be executed by processor 120 as well as data that may be manipulated by processor 120. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 (and other drawing figures), different numbers of entities/components than those depicted may be used. Furthermore, according to various implementations, the components described herein may be implemented in hardware and/or software that configures hardware.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 3:
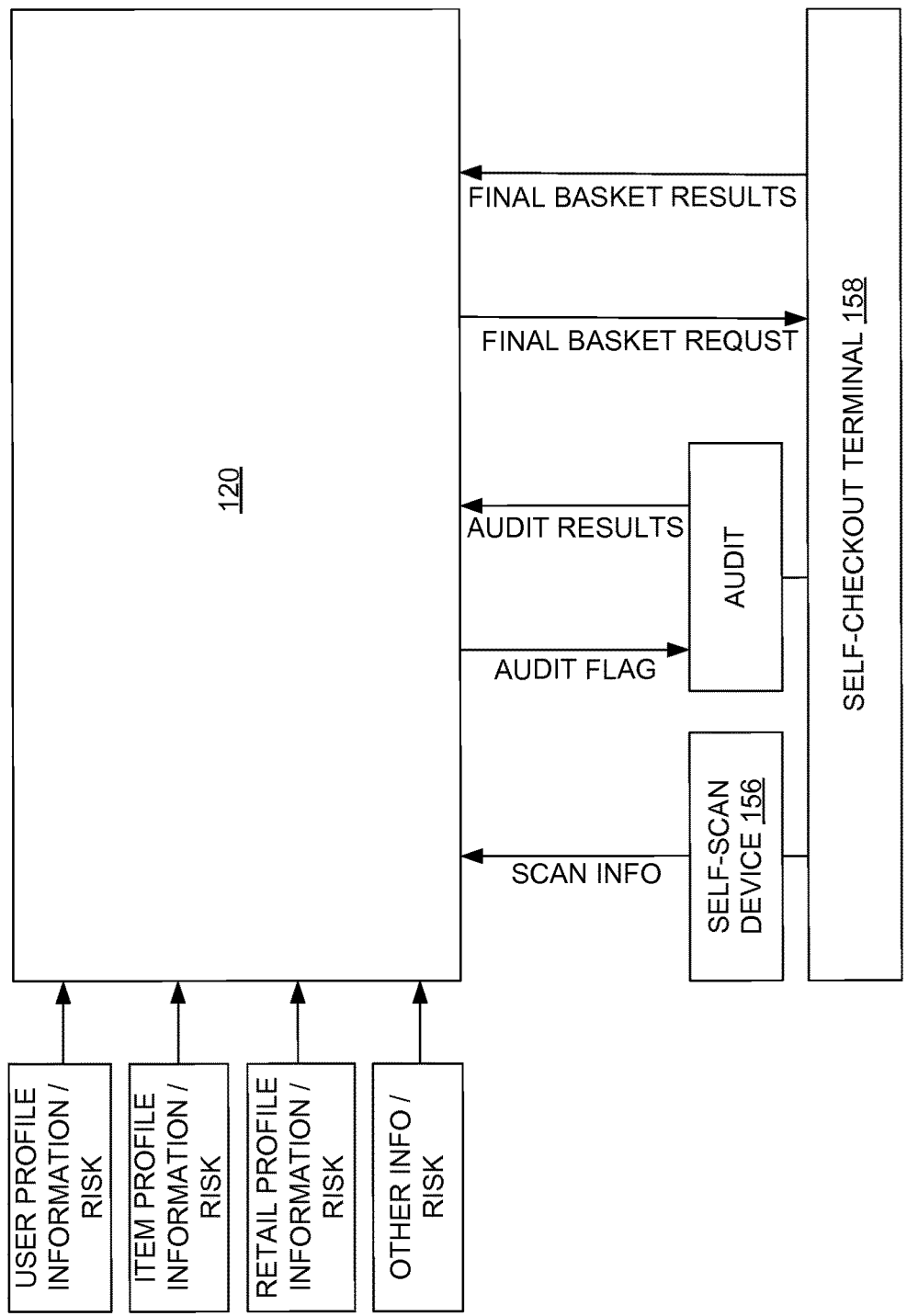
FIG. 3 illustrates a diagram of information flows and processing between system components, according to an implementation of the invention.

FIG. 3 illustrates a diagram of information flows and processing between system components, according to an implementation of the invention. In a self-scanning system, asset protection application 130 may obtain scan information from self-scan device 156. Although not illustrated in FIG. 3, asset protection application 130 may obtain the scan information via an Application Programming Interface ("API") that allows self-scan device 156 to communicate with asset protection application 130 in real-time during a shopping trip. For example, the API may communicate with a mobile or other application executing on self-scan device 156. Alternatively or additionally, asset protection application 130 may obtain the scan information from an intermediary device such as self-checkout terminal or other device that communicates with self-scan device 156.

Regardless of how scan information is received, asset protection application 130 may identify the customer operating self-scan device 156, a retail location at which the self-scan device is operated, items that are scanned by the self-scan device, and/or other information. Asset protection application 130 may determine a quantifiable risk associated with a scanned item, the customer, and/or the retail location. Based on the risk, asset protection application may cause an audit to occur by communicating an audit flag to an audit process, which may include a device used by asset protection personnel on site at the retail location.

After the audit is conducted, audit results are uploaded to asset protection application 130, which may cause the audit results to be stored in a database for historical analysis, as described herein. Asset protection application 130 may further use the audit results to fine-tune audit decisions for other customers.

In some implementations, asset protection application 130 may make a final basket request to self-checkout terminal 158 or other device or system used to checkout the basket after the audit. Self-checkout terminal 158 may provide the final basket results, which may include items actually checked out (e.g., after removing items that were not scanned and/or scanning items that were not scanned). In this manner, asset protection application 130 may be able to discern the types of scan errors that occurred, including whether such errors were intentional or not. For example, removal of items that were not scanned may indicate intentional scan errors while scanning items that were not scanned may indicate unintentional scan errors. In any event, asset protection application 130 may obtain detailed audit results and transaction information, which may be used to improve audit decisions.

Figure 4:
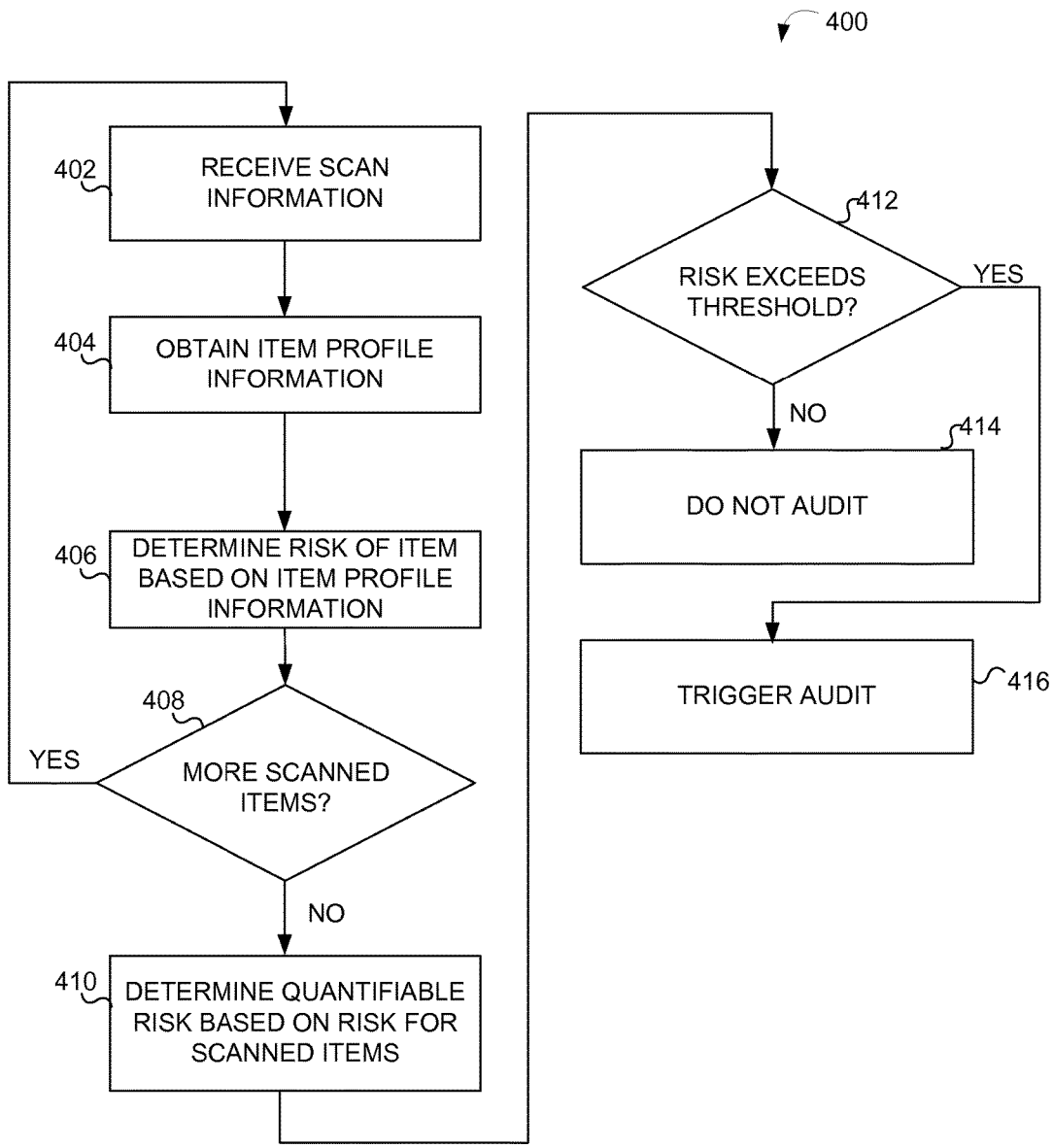
FIG. 4 illustrates a process of making an audit decision based on item profile information that describes a scanned item, according to an implementation of the invention.

FIG. 4 illustrates a process 400 of making an audit decision based on item profile information that describes a scanned item, according to an implementation of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, scan information may be received. An item that was scanned may be identified based on the scan information. In an operation 404, item profile information may be obtained. The item profile information may include various descriptions of the item such as a propensity of the item to be associated with a scan error.

In an operation 406, a risk associated with the item may be determined based on the item profile information. For example, the risk may include a probability that the item will be associated with a scan error. Such probability may be determined based on prior instances that the item was associated with an audit in which a scan error was detected. In a particular example, the probability may be determined based on a ratio of a number of instances that the item was used as a disguise item to hide items that were not scanned and a number of instances that the item was not used as a disguise item.

In an operation 408, a determination of whether more scanned items exist may be made. For example, a checkout indication or an abandoned basket indication may be received that indicates no more scanned items will be received. If more scanned items are received (or are to be received), processing may return to operation 402. Otherwise, in an operation 410, a quantifiable risk may be determined based on all of the quantifiable risks of scanned items. In an operation 412, a determination of whether the quantifiable risk meets or exceeds a threshold value, which may be configured by a user as described herein, may be made.

If the threshold value is not met or exceeded, a determination not to audit may be made in operation 414. On the other hand, if the threshold value is met or exceeded, an audit may be triggered in an operation 416. It should be noted that the audit may be triggered during the shopping trip. For example, the same threshold value or a different (e.g., higher) threshold value may be used to determine whether risk associated with one or more items are sufficiently high to warrant triggering an audit during the shopping trip. In some implementations, the same or another threshold value may be used to determine whether asset protection personnel (e.g., security) should be alerted to intervene when the risk is determined to be sufficiently high.

Figure 5:
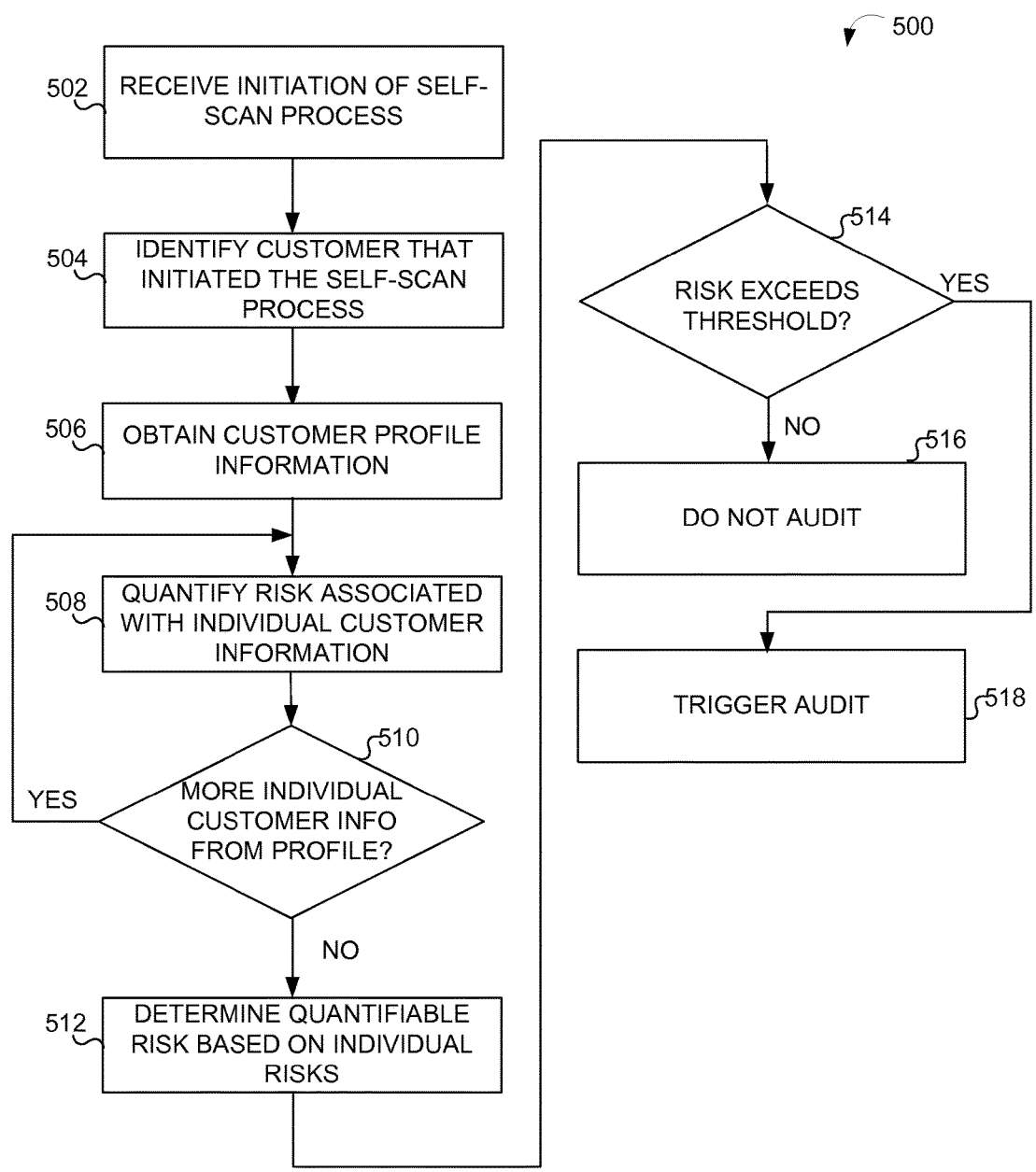
FIG. 5 illustrates a process of making an audit decision based on customer profile information that describes a customer, according to an implementation of the invention.

FIG. 5 illustrates a process 500 of making an audit decision based on customer profile information that describes a customer, according to an implementation of the invention. In an operation 502, an initiation of a self-scan process may be received. For example, a customer may scan a loyalty card or otherwise input a customer identification to start a self-scan shopping trip. In an operation 504, the customer may be identified based on the initiated self-scan process. In an operation 506, customer profile information may be obtained. The customer profile information may include information that indicates a propensity of the customer to be associated with scan errors.

In an operation 508, a risk associated with individual customer information may be quantified. For example, the fact that the customer was involved in previous mobile commerce basket abandonments may be quantified into a given risk. For example, based on historic data, customers who have a certain number of abandoned baskets may tend to have a certain percentage of scan errors during audits. The certain percentage may be used to determine the quantifiable risk for the customer. Other individual customer information may include whether and how often the customer has returned an item, credit information, and/or other information known about the customer, as described herein.

In an operation 510, a determination of whether more individual customer information is available from the customer profile information. If more information is available, processing may return to operation 508. On the other hand, if more information is not available, a quantifiable risk may be determined based collectively on individual risks determined at operation 508. For example, the individual risks may be summed to arrive at a total risk. Each individual risk may be weighted with respect to other risks.

In an operation 514, a determination of whether the quantifiable risk meets or exceeds a threshold value may be made. If the threshold value is not met or exceeded, then an audit is not triggered in an operation 516. On the other hand, if the threshold value is met or exceeded, an audit may be triggered in an operation 518.

Figure 6:
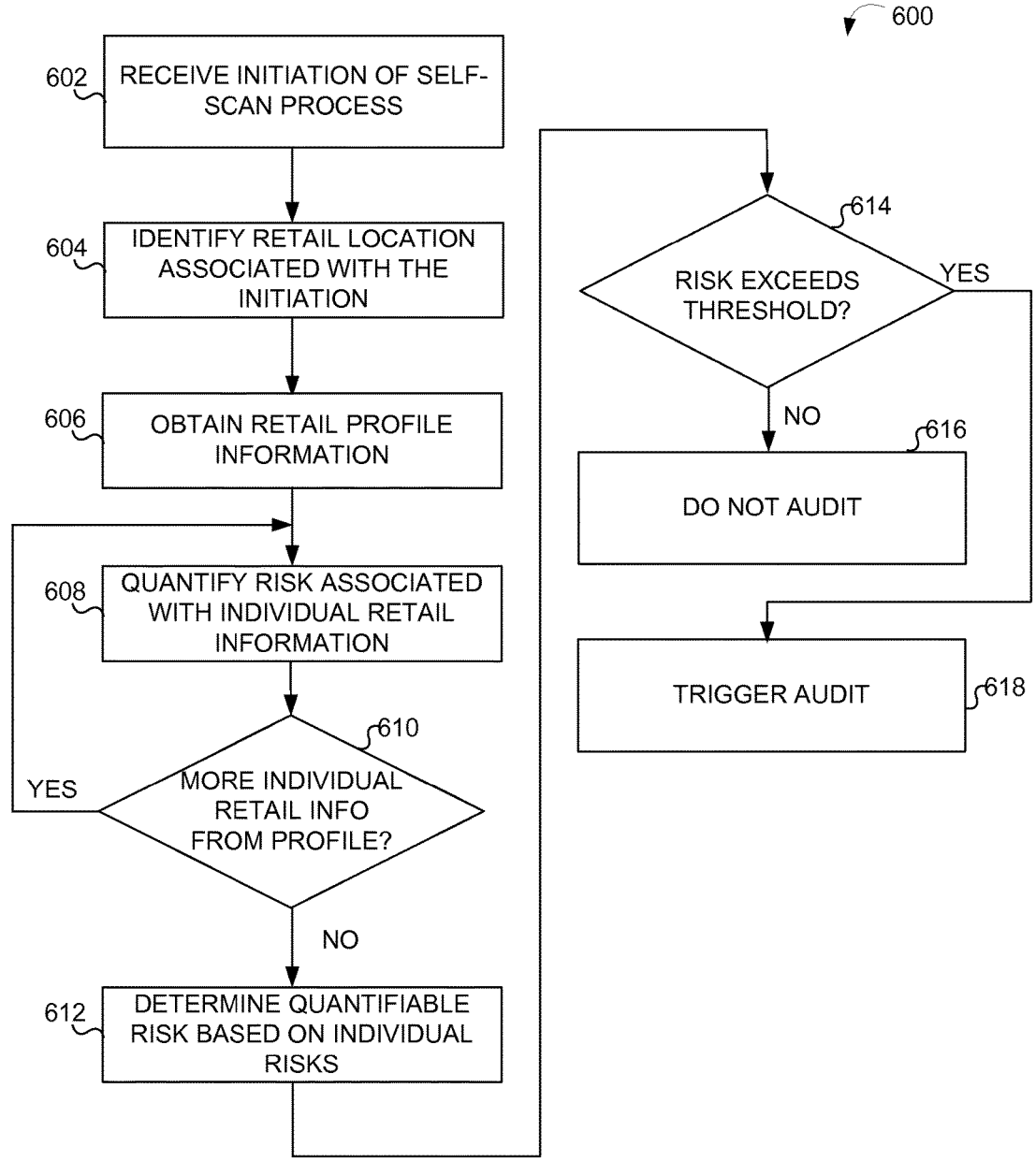
FIG. 6 illustrates a process of making an audit decision based on retail profile information that describes a retail location, according to an implementation of the invention.

FIG. 6 illustrates a process 600 of making an audit decision based on retail profile information that describes a retail location, according to an implementation of the invention. In an operation 602, an initiation of a self-scan process may be received. For example, a customer may scan a loyalty card or otherwise input a customer identification to start a self-scan shopping trip. In an operation 604, the retail location may be identified based on the initiated self-scan process. In an operation 606, retail profile information may be obtained. The retail profile information may include information that indicates a propensity of the retail location to be associated with scan errors.

In an operation 608, a risk associated with individual retail information may be quantified. For example, the retail location may be located at a geographic location that tends to have a high incidence of scan errors. The risk may be quantified based on historical scan errors detected at the retail location versus: other retail locations for the given retailer, other retailers in the same type of business, all retail locations known by the system, and/or other retail locations. Other individual retail information may include types of departments the retail location includes, types of items the retail location sells, hours of operation, and/or other information known about the retail location, as described herein.

In an operation 610, a determination of whether more individual retail information is available from the retail profile information. If more information is available, processing may return to operation 608. On the other hand, if more information is not available, a quantifiable risk may be determined based collectively on individual risks determined at operation 608. For example, the individual risks may be summed to arrive at a total risk. Each individual risk may be weighted with respect to other risks.

In an operation 614, a determination of whether the quantifiable risk meets or exceeds a threshold value may be made. If the threshold value is not met or exceeded, then an audit is not triggered in an operation 616. On the other hand, if the threshold value is met or exceeded, an audit may be triggered in an operation 618.

Figure 7:
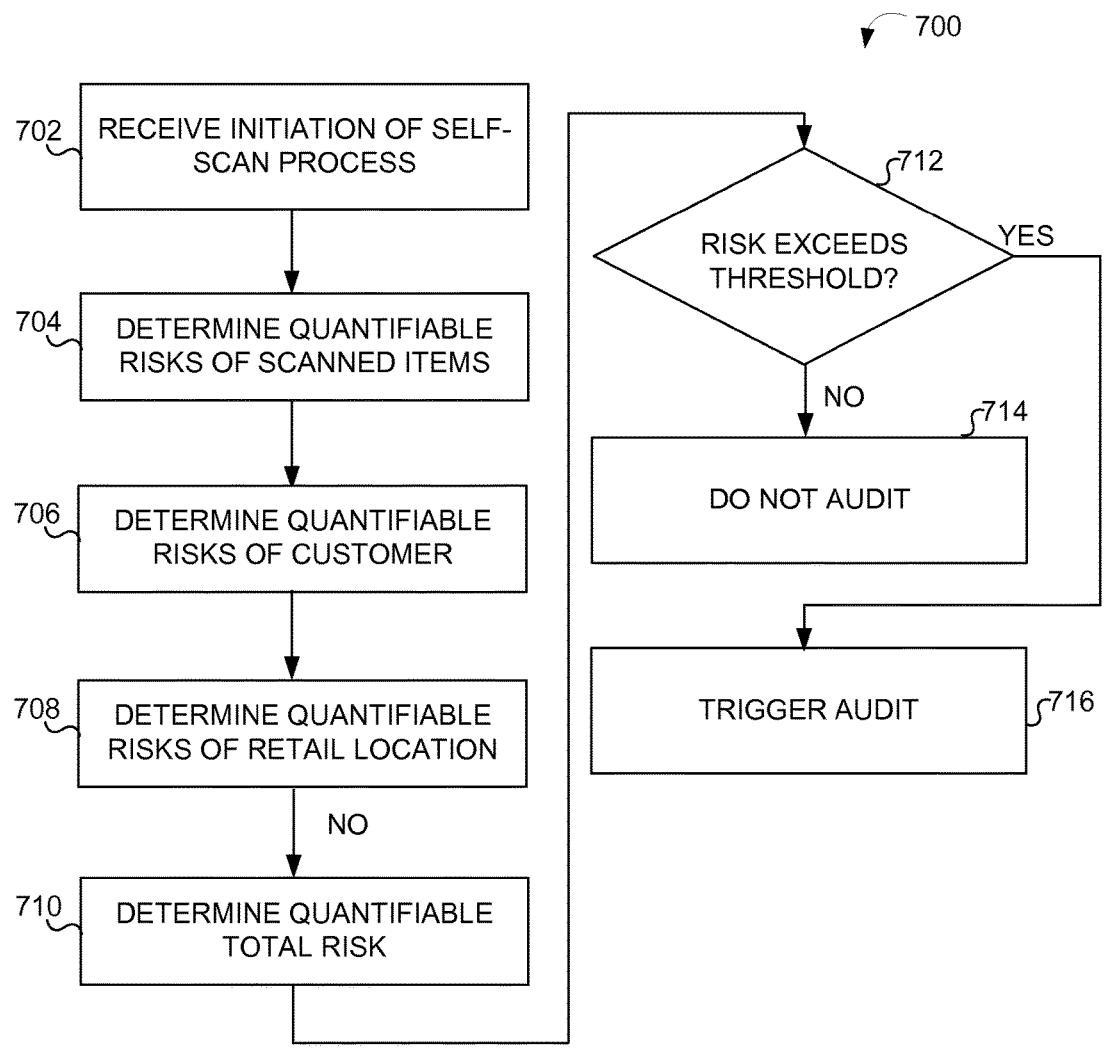
FIG. 7 illustrates a process of making an audit decision based on item profile information, customer profile information, and/or retail profile information, according to an implementation of the invention.

FIG. 7 illustrates a process 700 of making an audit decision based on item profile information, customer profile information, and/or retail profile information, according to an implementation of the invention.

In an operation 702, an initiation of a self-scan process may be received. For example, a customer may scan a loyalty card or otherwise input a customer identification to start a self-scan shopping trip. In an operation 704, quantifiable risks associated with scanned items may be determined. Such determination may be made using one or more of the processing operations of process 400 described at FIG. 4. In an operation 706, quantifiable risks associated with the customer who is operating a self-scan device may be determined. Such determination may be made using one or more of the processing operations of process 500 described at FIG. 5. In an operation 708, quantifiable risks associated with the retail location at which the self-scan shopping trip is taking place may be determined. Such determination may be made using one or more of the processing operations of process 600 described at FIG. 6.

In an operation 710, a quantifiable total risk may be determined based on the risk determined for the scanned items, risk determined for the customer, and/or risk determined for the retail location. Each of the foregoing risks may be weighted with respect to one another. Furthermore, some of all of the foregoing risks may be used to determine the quantifiable total risk. For example, the scanned items risk determined at operation 704, the customer risk determined at operation 706, and the retail location risk determined at operation 708 may each be individually used to determine the quantifiable total risk. In other implementations, the customer risk and the retail location risk may be together totaled (e.g., summed or otherwise combined) to determine the quantifiable total risk. In still other implementations, the customer risk and the scanned items risk may be together totaled (e.g., summed or otherwise combined) to determine the quantifiable total risk. In still other implementations, the scanned items risk and the retail location risk may be together totaled (e.g., summed or otherwise combined) to determine the quantifiable total risk.

In some implementations, other information such as current shopping trip information may be used to quantify risk, which may be used alone or with in any of the foregoing combinations of risks to determine a quantifiable total risk. For example, the length of time that the customer spends at a particular department or location of the retail location without a scan may be used to determine a quantifiable risk that is part of the quantifiable total risk. Other shopping trip information such as items scanned being out of sequence relative to a planogram or other information that indicates the layout of a retail location, total basket sizes, ratio between scanned items and duration of the shopping trip, gaps between scans, restroom breaks, restaurant/dining breaks, and/or other information In an operation 712, a determination of whether the quantifiable total risk meets or exceeds a threshold value may be made. If the threshold value is not met or exceeded, then an audit is not triggered in an operation 714. On the other hand, if the threshold value is met or exceeded, an audit may be triggered in an operation 716.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of selectively auditing baskets in a self-scan system, the method being implemented on a computer system having one or more physical processors programmed with computer program instructions that, when executed by the one or more physical processors, cause the computer system to perform the method, the method comprising:
  receiving, by the computer system via a self-scan device, a customer identification that identifies a customer associated with a current shopping trip at a location, the self-scan device configured to receive scan information;
  receiving, by the computer system via the self-scan device, customer location information determined by the self-scan device based on Global Positioning System information, wherein the customer location information indicates real-time customer location during the current shopping trip;
  obtaining, by the computer system, customer profile information associated with the customer identified by the customer identification, wherein the customer profile information includes an indication of at least a first item that was previously purchased by the customer;
  determining, by the computer system, that the first item has not been scanned during the current shopping trip;
  determining, by the computer system, a first level of risk associated with the customer based on the determination that the first item has not been scanned during the current shopping trip;
  receiving, by the computer system via the self-scan device, the scan information comprising an item identification that identifies a second item that was scanned by the self-scan device during the current shopping trip;
  obtaining, by the computer system, item profile information associated with the item identification, wherein the item profile information includes an indication that the second item is packaged in a manner that is used to conceal other items;
  determining, by the computer system, a second level of risk associated with the second item based on the indication that the second item is packaged in a manner that is used to conceal other items;
  determining, by the computer system, a third level of risk based on real-time metrics comprising scanning activity and locations of customers at the location; and
  causing, by the computer system, an audit to occur based on the first level of risk, the second level of risk, and the third level of risk.

2. The method of claim 1, wherein the customer profile information includes an identifier associated with a computing device used by the customer, the method further comprising:
  determining, by the computer system, that the computing device is associated with an activity that represents a risk, wherein the first level of risk is based on the activity.

3. The method of claim 1, wherein the customer profile information includes a credit score or credit report related to the customer, the method further comprising:
  determining, by the computer system, that the credit score or credit report represents a risk, wherein the first level of risk is based on the determined risk.

4. The method of claim 1, wherein the customer profile information indicates a use by the customer of a stolen, lost, or over-limit credit card, the method further comprising:
  determining, by the computer system, that the use of the stolen, lost, or over-limit credit card represents a risk, wherein the first level of risk is based on the determined risk.

5. The method of claim 1, wherein the customer profile information includes demographic information of the customer, and wherein the method further comprising:
  determining, by the computer system, a third item expected to be purchased by the customer based on the demographic information;

determining, by the computer system, that the third item has not been scanned during the current shopping trip; and wherein determining the first level of risk is based further on the determination that the third item has not been scanned during the current shopping trip.

6. The method of claim 1, the method further comprising:

obtaining, by the computer system, current shopping information that describes a current shopping behavior of the customer, wherein the current shopping information comprises an indication of a first location visited by the customer;

determining, by the computer system, a length of time that the customer visited the first location based on the current shopping information;

determining, by the computer system, that no item from the first location was scanned during the current shopping trip; and determining, by the computer system, a fourth level of risk based on the determination that no item from the first location was scanned, wherein the audit is caused based further on the fourth level of risk.

7. The method of claim 1, the; method further comprising:

obtaining, by the computer system, current shopping information that describes a current shopping behavior of the customer, wherein the current shopping information comprises an indication of a plurality of locations visited by the customer during the current shopping trip;

determining, by the computer system, that an item that was scanned during the current shopping trip is not shelved at any one of the plurality of location visited by the customer; and determining, by the computer system, a fourth level of risk based on the determination that the item that was scanned is not shelved at any one of the plurality of location visited by the customer, wherein the audit is caused based further on the fourth level of risk.

8. The method of claim 1, the method further comprising:

obtaining, by the computer system, current shopping information that describes a current shopping behavior of the customer, wherein the current shopping information comprises an indication of a plurality of locations visited by the customer during the current shopping trip;

determining, by the computer system, that the plurality of locations were visited along a particular path; and determining, by the computer system, a fourth level of risk based on the path, wherein the audit is caused based further on the fourth level of risk.

9. The method of claim 1, the method further comprising:

identifying, by the computer system, a retail location associated with the current shopping trip;

obtaining, by the computer system, retail profile information associated with the identified retail location; and determining, by the computer system, a fourth level of risk based on retail profile information, wherein the audit determination is made based further on the fourth level of risk.

10. The method of claim 9, wherein the retail profile information comprises a geographic location at which the retail location is located, wherein the fourth level of risk is based on the geographic location.

11. The method of claim 9, wherein the retail profile information comprises store hours during which the retail location is open, wherein the fourth level of risk is based on the store hours.

12. The method of claim 11, wherein the fourth level of risk comprises at least two levels of risk for different store hours such that the fourth level of risk changes depending on the time.

13. A computer-implemented system of selectively auditing baskets in a self-scan system, the system comprising:

a computer system comprising one or more physical processors programmed with computer program instructions that, when executed by the one or more physical processors, cause the computer system to:

receive, via a self-scan device, a customer identification that identifies a customer associated with a current shopping trip, the self-scan device configured to receive scan information;

receive, via the self-scan device, customer location information determined by the self-scan device based on Global Positioning System information, wherein the customer location information indicates real-time customer location during the current shopping trip;

obtain customer profile information associated with the customer identified by the customer identification, wherein the customer profile information includes an indication of at least a first item that was previously purchased by the customer;

determine that the first item has not been scanned during the current shopping trip;

determine a first level of risk associated with the customer based on the determination that the first item has not been scanned during the current shopping trip;

receive, via the self-scan device, the scan information comprising an item identification that identifies a second item that was scanned by the self-scan device during the current shopping trip;

obtain item profile information associated with the item identification, wherein the item profile information includes an indication that the second item is packaged in a manner that is used to conceal other items;

determine a second level of risk associated with the second item based on the indication that the second item is packaged in a manner that is used to conceal other items;

determine a third level of risk based on real-time metrics comprising scanning activity and locations of customers at the location; and cause an audit to occur based on the first level of risk, the second level of risk, and the third level of risk.

14. The system of claim 13, wherein the customer profile information includes an identifier associated with a computing device used by the customer, and wherein the computer system is further programmer to:

determine that the computing device is associated with an activity that represents a risk, wherein the first level of risk is based on the activity.

15. The system of claim 13, wherein the customer profile information includes a credit score or credit report related to the customer, and wherein the computer system is further programmed to:

determine that the credit score or credit report represents a risk, wherein the first level of risk is based on the determined risk.

16. The system of claim 13, wherein the customer profile information indicates a use by the customer of a stolen, lost, or over-limit credit card, and wherein the computer system is further programmed to:

determine that the use of the stolen, lost, or over-limit credit card represents a risk, wherein the first level of risk is based on the determined risk.

17. The system of claim 13, wherein the customer profile information includes demographic information of the customer, and wherein the computer system is further programmed to:
   determine a third item expected to be purchased by the customer based on the demographic information;
   determine that the third item has not been scanned during the current shopping trip;
   and wherein the first level of risk is based further on the determination that the third item has not been scanned during the current shopping trip.

18. The system of claim 13, wherein the computer system is further programmed to:
   obtain current shopping information that describes a current shopping behavior of the customer, wherein the current shopping information comprises an indication of a first location visited by the customer;
   determine a length of time that the customer visited the first location based on the current shopping information;
   determine that no item from the first location was scanned during the current shopping trip; and
   determine a fourth level of risk based on the determination that no item from the first location was scanned, wherein the audit is caused based further on the fourth level of risk.

19. The system of claim 13, wherein the computer system is further programmed to:
   obtain current shopping information that describes a current shopping behavior of the customer, wherein the current shopping information comprises an indication of a plurality of locations visited by the customer during the current shopping trip;
   determine that an item that was scanned during the current shopping trip is not shelved at any one of the plurality of location visited by the customer; and
   determine a fourth level of risk based on the determination that the item that was scanned is not shelved at any one of the plurality of location visited by the customer, wherein the audit is caused based further on the fourth level of risk.

20. The system of claim 13, wherein the computer system is further programmed to:
   obtain current shopping information that describes a current shopping behavior of the customer, wherein the current shopping information comprises an indication of a plurality of locations visited by the customer during the current shopping trip;
   determine that the plurality of locations were visited along a particular path; and
   determine a fourth level of risk based on the path, wherein the audit is caused based further on the fourth level of risk.

21. The system of claim 13, wherein the computer system is further programmed to:
   identify a retail location associated with the current shopping trip;
   obtain retail profile information associated with the identified retail location; and
   determine a fourth level of risk based on retail profile information, wherein the audit determination is made based further on the fourth level of risk.

22. The system of claim 21, wherein the retail profile information comprises a geographic location at which the retail location is located, and wherein the fourth level of risk is based on the geographic location.

23. The system of claim 21, wherein the retail profile information comprises store hours during which the retail location is open, and wherein the fourth level of risk is based on the store hours.

24. The system of claim 23, wherein the fourth level of risk comprises at least two levels of risk for different store hours such that the fourth level of risk changes depending on the time.

25. The method of claim 1, the method further comprising:
   determining, based on the customer profile information, that the customer has previously abandoned a self-scan shopping basket during a previous shopping trip, wherein the audit is caused based further on the determination that the customer has previously abandoned the self-scan shopping basket during the previous shopping trip.

26. The method of claim 1, the method further comprising:
   obtaining an indication of a frequency with which an audit should occur at a retail location at which the current shopping trip takes place, wherein the audit is caused based further on the frequency with which audits should occur storewide within a given time period.

27. The method of claim 26, the method further comprising:
   obtaining one or more user-selectable audit parameters from a user associated with the retail location, wherein the frequency is adjusted based on the one or more user-selectable audit parameters.

28. The method of claim 1, the method further comprising:
   communicating an alert that indicates that the audit has been caused to occur, wherein the alert comprises one or more messages related to the audit.

29. The method of claim 1, wherein a alert is communicated via a Short Message Service text message.

* * * * *